United States Patent [19]

Nakamura

[11] Patent Number: 4,591,179
[45] Date of Patent: May 27, 1986

[54] BAR STEPS FOR A SMALL-SIZED VEHICLE

[75] Inventor: Nagatoshi Nakamura, Saitama, Japan

[73] Assignee: Honda Giken Kogyo Kabushiki Kaisha, Tokyo, Japan

[21] Appl. No.: 616,008

[22] Filed: May 31, 1984

[30] Foreign Application Priority Data

Jun. 4, 1983 [JP] Japan .................. 58-98788

[51] Int. Cl.⁴ ............................................. B62J 25/00
[52] U.S. Cl. ...................... 280/291; 74/563; 74/564
[58] Field of Search ............ 280/291, 281, 164 A, 280/169; 180/219; 74/594.7, 594.4, 564, 563; 182/228, 127, 91; 296/75

[56] References Cited

U.S. PATENT DOCUMENTS

| | | | |
|---|---|---|---|
| 379,557 | 3/1888 | Benfield | 280/291 |
| 640,607 | 1/1900 | Wardwell | 280/291 |
| 4,345,487 | 8/1982 | Straker | 74/563 |

FOREIGN PATENT DOCUMENTS

16794 of 1887 United Kingdom ............ 280/291

Primary Examiner—John J. Love
Assistant Examiner—Everett G. Diedériks, Jr.
Attorney, Agent, or Firm—Lyon & Lyon

[57] ABSTRACT

Bar steps of a small-sized vehicle provided in association with underframes of a small-sized vehicle of the type that a rider rides the vehicle by straddling a vehicle body frame and a seat (motorcycle, motor tricycle), characterized in that each of the bar steps is formed of a step main body and a cover member covering the step main body, the step main body is supported from the underframe, the cover member includes an elastic piece as a part thereof and as swingably supported directly or indirectly from a support member provided in association with the underframe or from the step main body, and the cover member can take an attitude for covering the step main body and an erected attitude deviated toward the vehicle body frame owing to its swing motion.

12 Claims, 17 Drawing Figures

BAR STEPS FOR A SMALL-SIZED VEHICLE

BACKGROUND OF THE INVENTION

The field of the present invention relates to bar steps applicable to small-sized vehicles of the type wherein a rider straddles the vehicle body frame and seat such as, for example, motorcycles, motor tricycles, etc., and more particularly to a pair of right and left bar steps provided in association with underframes of the above-referred type of vehicles.

On motorcycles intended to be run on public roads, bar steps have been constructed of metal support members provided in association with an underframe and covered by step rubber pieces. On the other hand, motorcycles intended to run off-road, over rough terrain, have employed bar steps constructed of metal support members provided in association with an underframe and having curved metal plates with teeth-shaped notches along the upper edge. Such covered metal plates having teeth-shaped notches make contact with the bottom of a boot worn by a rider and bite into the bottom to reliably hold the boot in position when riding over rough terrain.

In some cases, however, an off-road type motorcycle might be run on public roads. In such cases, it may be undesirable to use steps constructed of curved metal plates having teeth-shaped notches. The teeth-shaped notches may possibly damage boots or other shoes not intended for off-road use. In order to avoid such damage, it is advisable to replace the above-mentioned bar steps for off-road running with the above-described bar steps for on-road running making use of a step rubber. Thereafter, when the motorcycle is run on rough terrain, the bar steps must be replaced again Similarly, an on/off-road motorcycle intended to be run both on public roads as well as rough terrain, as may be seen from its name, requires an appropriate selection of either bar steps for on-road running or bar steps for off-road running. The problem of switching between bar steps is similar to the case of the off-road type motorcycle. In either case, the replacement work is troublesome.

SUMMARY OF THE INVENTION

It is therefore a principal object of the present invention to provide bar steps for use on a motorcycle or the like which need not be replaced according to riding conditions.

A more specific object of the present invention is to provide bar steps each comprising a cover member including an elastic piece (for instance, made of rubber) which is to be used for running on public roads, and a step main body having teeth-shaped notches formed thereon which is to be used for running on rough terrain.

Another object of the present invention is to provide bar steps each having a structure such that the above-mentioned cover member can be retracted to a position where the cover member does not interfere when the motorcycle runs on rough terrain.

In order to achieve the aforementioned objects of the present invention, according to one feature of the present invention, there may be provided bar steps comprising essentially a step main body having teeth-shaped notches formed on its top surface, and a cover member including an elastic piece adapted to cover the top surface of the step main body. The step main body is preferably fixedly secured to a vehicle body frame, and the cover member is mounted to the step main body or to the vehicle body frame in such a manner that it can be arbitrarily swung between a position adapted to cover the step main body and a standing position adjacent the vehicle body.

The above-mentioned and other features and advantages of the present invention will become more apparent upon perusal of the following detailed description taken in conjunction with the accompanying drawings.

DESCRIPTION OF THE PREFERRED EMBODIMENTS

Figure 1:
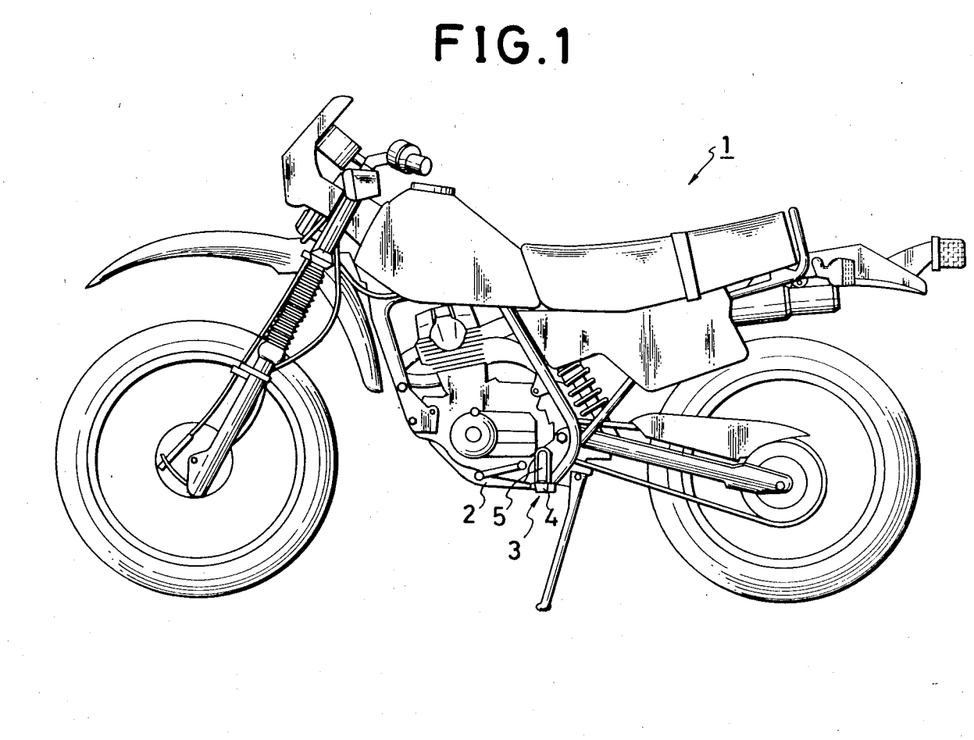
FIG. 1 is an elevational view of a motorcycle provided with bar steps according to one preferred embodiment of the present invention as viewed from the left side of the vehicle body.
Figure 2:
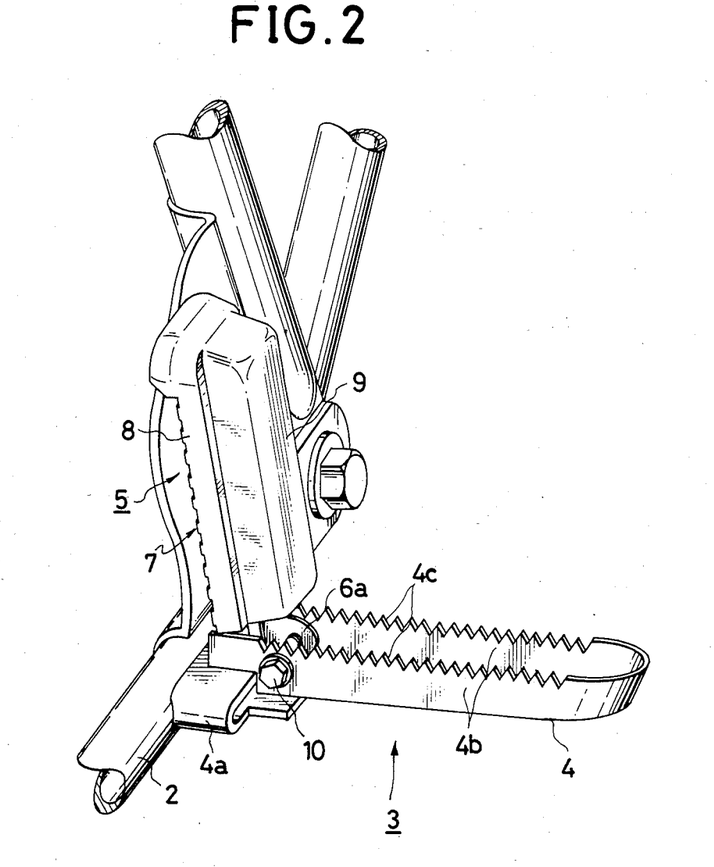
FIG. 2 is an enlarged perspective view of a bar step of the motorcycle of FIG. 1.
Figure 3:
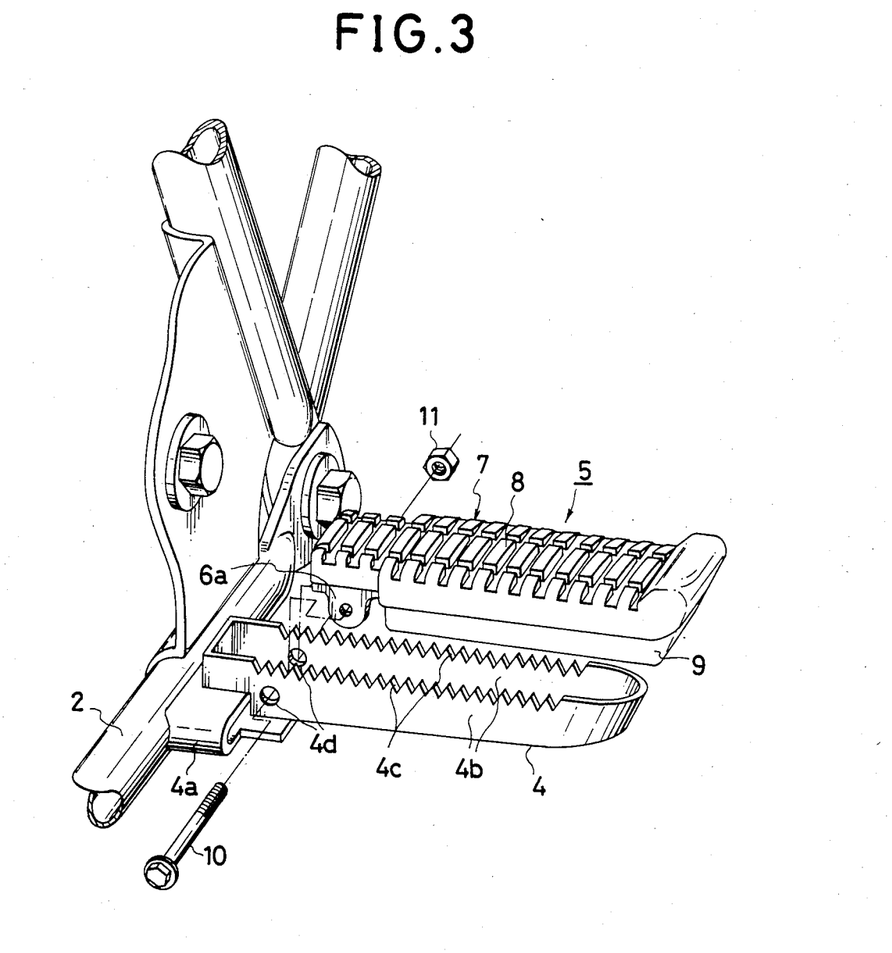
FIG. 3 is an exploded perspective view of the same bar step as viewed in the same direction as FIG. 2.

One preferred embodiment of the present invention is illustrated in FIGS. 1 through 8. A motorcycle shown in FIG. 1 is an on/off-road type motorcycle in which bar steps 3 are provided as projecting from a pair of right and left underframes 2, respectively, which form a part of a vehicle body frame. Each of the bar steps 3 is constructed of a metallic step main body 4 and a cover member 5. The step main body 4 is fixedly secured at its base portion 4a to an underframe 2. The cover member 5 is supported from opposed sidewalls 4b of the step main body 4 in a swingable manner. Except for the base portion 4a, the step main body 4 is formed in such a configuration that the ground surface can be seen therethrough from above. The main body 4 is not provided with a top wall or a bottom wall for interconnecting the opposed sidewalls 4b, 4b as can be seen in FIG. 2. The Figures illustrate only left side bar steps, the right side bar steps being omitted from illustration because they have a similar but symmetric structure to that of the left side bar steps.

Along the top edges of the opposed sidewalls 4b of the above-described step main body 4, there are teeth-shaped notches 4c. Bolt holes 4d are formed in the respective sidewalls 4b at the positions adjacent the base portion 4a (see FIG. 3). A bolt 10 extends through the pair of bolt holes 4d and is assembled with a nut 11. The cover member 5 is thereby swingably supported at a pair of tongues 6a having bolt holes therethrough and projecting from one end portion of the cover member 5 by means of the bolt 10.

The above-described cover member 5 is formed of a channel-shaped metal core 6 having a pair of tongues 6a at its base portion and a rubber piece 7. The rubber piece covers the upper and side surfaces of the metal core 6 as well as its tip end portion 6b and is fitted in the channel on the underside of the metal core 6 (see FIGS. 4 to 8). This rubber piece 7 is integrally secured to the metal core 6 by baking. Many recessed grooves 8a are formed in the top cover portion 8 thereof to provide an antiskid function. Also the top cover portion 8 covers the side surfaces of the metal core 6. In addition, portion 9 of the rubber piece 7 fits in the channel on the underside of the metal core 6. It covers the bottom edge of the metal core 6 from the underside and projects downwardly from the bottom surface 8b of the top cover portion 8 and the bottom edge of the metal core 6. This downwardly projecting portion 9 is sized to snugly fit between the sidewalls 4b of the step main body 4 to engage the step main body 4.

Figure 4:
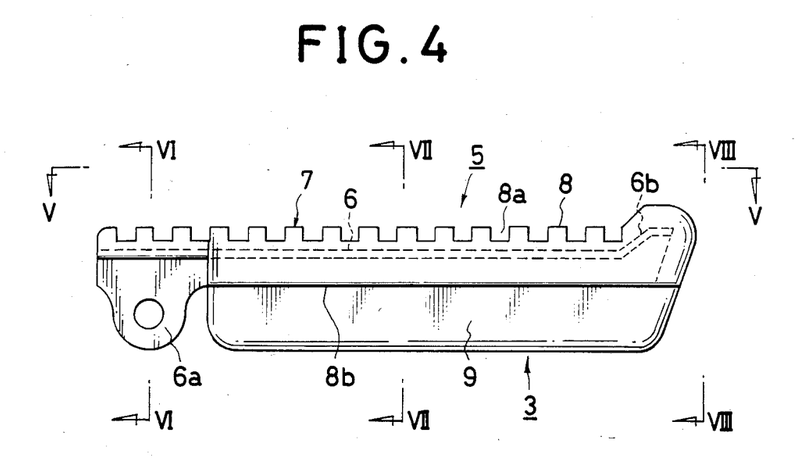
FIG. 4 is a side elevational view of the cover member covering the step main body.
Figure 5:
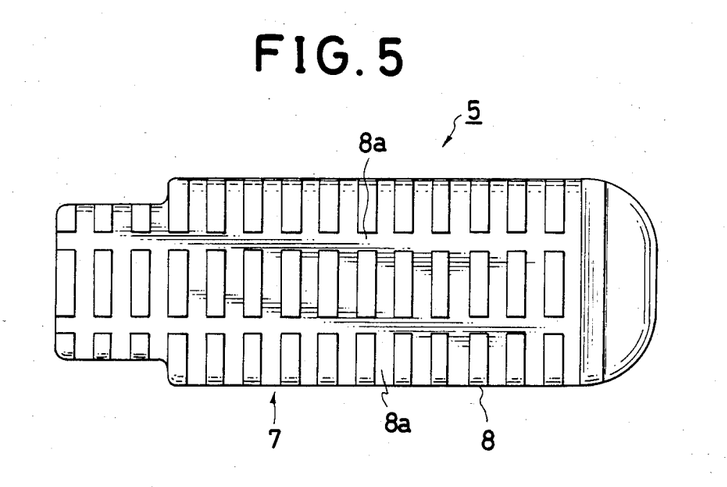
FIG. 5 is a plan view of the cover member taken along line V—V of FIG. 4.
Figure 6:
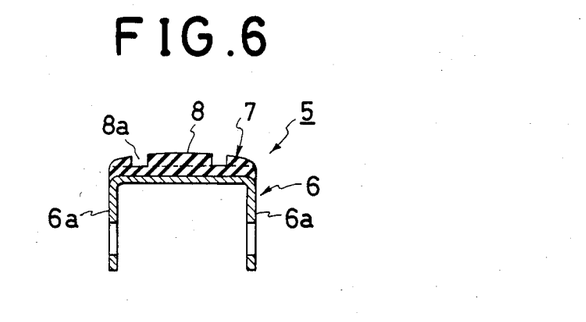
FIGS. 6 and 7 are cross-section views taken along lines VI—VI and VII—VII, respectively, of FIG. 4.
Figure 7:
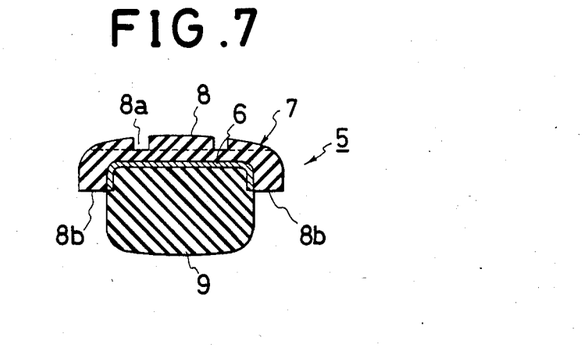
Figure 8:
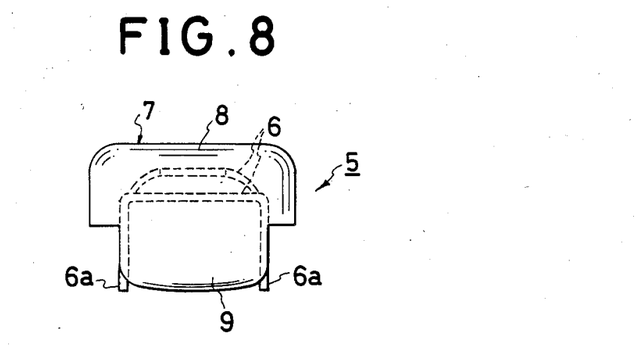
FIG. 8 is an end elevational view of the cover member taken along line VIII—VIII of FIG. 4.

When a rider is riding off-road on the motorcycle 1 using the bar steps 3, the cover members 5 supported at the tongues 6a about the bolts 10 on either side of the motorcycle 1 are erected and somewhat tilted toward the vehicle body frame to expose the teeth-shaped notches 4c of the step main bodies 4 as shown in FIG. 4. Under this condition, the outer surface of the underside engagement portion 9 of the rubber piece 7 faces the inside of the foot placed on the step main body 4 and serves as a protecting member so that a boot worn by a rider will not make direct contact with members on the side of the vehicle body (for instance, bolt heads). Accordingly, upon running on rough terrain, guards are provided to protect the boots as the boots may be violently moved to impact the motorcycle during such operation.

On the other hand, when running on public roads, the cover member 5 is swung about the bolt 10 so as to cover the top surface of the step main body 4. At this time, the engagement portion 9 of the rubber piece 7 makes close contact with the inner surfaces of the respective sidewalls 4b of the step main body 4, and the bottom surface 8b of the top cover portion 8 abutts against the teeth of the teeth-shaped notches 4c. Under this condition, the bottom of a dress boot or shoe can be protected from the teeth-shaped notches 4c. Moreover, since the top surface of the rubber piece 7 is given an uneven configuration by many recessed grooves 8a, the friction at the contact surfaces between the top surface and the bottom of the boot or shoe is enhanced for a stable ride.

As described above, in this preferred embodiment, since the bar step 3 is formed of a step main body 4 and a swingable cover member 5, the bar step 3 can be effectively adapted to running on public roads and alternatively to running on rough terrain by simply swinging the cover member 5. Therefore, the difficulty and inconvenience of replacing the bar steps depending upon the intended riding conditions are eliminated and the practical advantages of the embodiment are great.

Figures 9, 10:
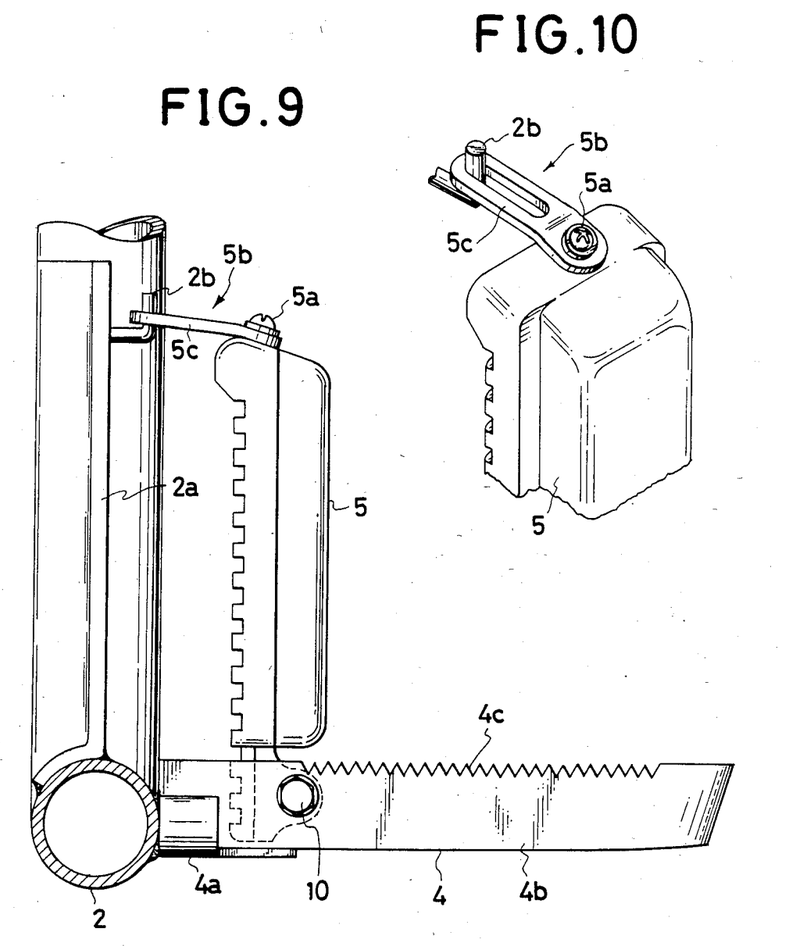
FIG. 9 is a side elevational view showing a modified embodiment of the bar step as viewed from the front of the vehicle.
FIG. 10 is a perspective view of part of the bar step shown in FIG. 9.
Figure 11:
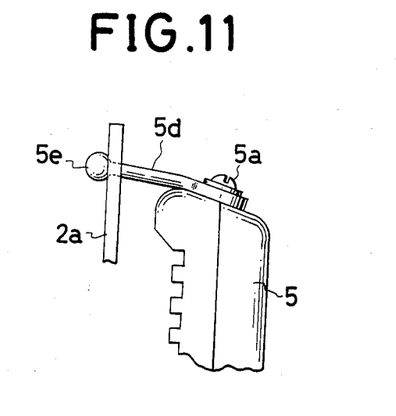
FIG. 11 is an elevational view of another modified embodiment of the bar step as viewed from the front of the vehicle.
Figure 12:
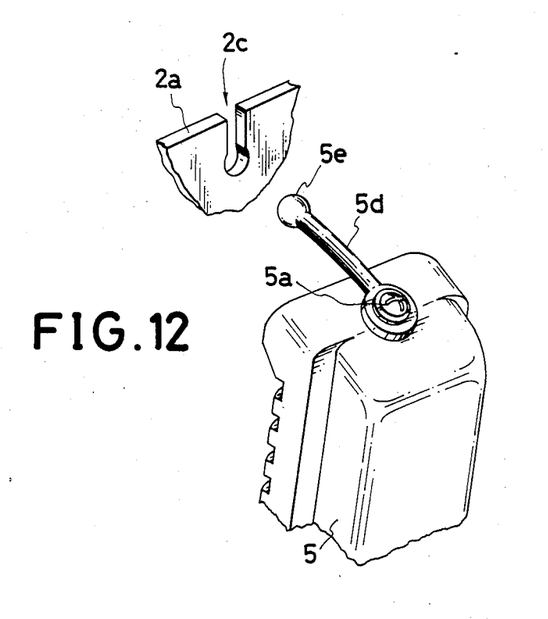
FIG. 12 is a perspective view of the device of FIG. 11.

Turning then to the modified embodiments illustrated in FIGS. 9 and 10 and in FIGS. 11 and 12, mechanisms for locking the cover member 5 in the erected condition are illustrated. The cover member 5 in the bar step 3 described above takes, at its erected condition as seen in FIG. 2, an attitude somewhat tilted toward the vehicle body frame with respect to the vertical line. Because the cover member 5 is pivoted beyond vertical, gravity acted upon the cover member 5 to retain the member in the erected position. Also frictional forces are exerted upon the contact surfaces between the step main body 4 and/or bolt 10 and the cover member 5, and therefore, the cover member 5 can stably maintain its erected attitude. However, if any locking means for preventing backward swinging is added to the free end portion of the cover member 5, the erected attitude of the cover member 5 can be more surely maintained.

One example of the locking means is illustrated in FIGS. 9 and 10, in which a locking piece 5b made of elastic material (for example, rubber, resin, etc.) is mounted to the free end of the cover member 5 by means of a screw 5a. The tip end portion 5c of this locking piece 5b is formed in a loop shape. This loop-shaped portion 5c may be engaged with a hook 2b provided on a reinforcement plate 2a which is in turn fixedly secured to intersecting pipes of the vehicle body frame. Owing to this locking engagement, the erected attitude of the cover member 5 can be maintained. Of course, the hook 2b may not always be provided on the reinforcement plate depending upon structure of the vehicle body frame.

Another example of the locking means is illustrated in FIGS. 11 and 12, in which a locking piece 5d made of elastic material (for example rubber, resin, etc.) but having a different configuration from that of FIG. 9 is mounted to the free end of the cover member 5 by means of a screw 5a. The tip end portion 5e of this locking piece 5d is formed in a spherical shape, and this spherical end portion 5e is engaged with a keyhole-shaped notch 2c formed at an edge of the reinforcement plate 2a. With this modified locking means, the erected attitude of the cover member 5 can be maintained.

Either of the locking pieces 5b and 5c can be easily engaged with and disengaged from the hook 2b or the notch 2c in one action, and moreover since the locking piece is formed of a small elastic piece, even if the locking piece projects laterally from the motorcycle when the cover member 5 is down, it would not affect the rider at all.

It is to be noted that the locking piece 5b or 5d need not be attached always to the cover member 5, but it could be fixedly secured to the reinforcement plate 2a, while a small protrusion (for instance, a hook-shaped piece) is provided at the free end portion of the cover plate 5 so that the locking piece may be detachably engaged with the small protrusion. If such modification is made, the appearance of the cover member 5 can be improved.

Figure 13:
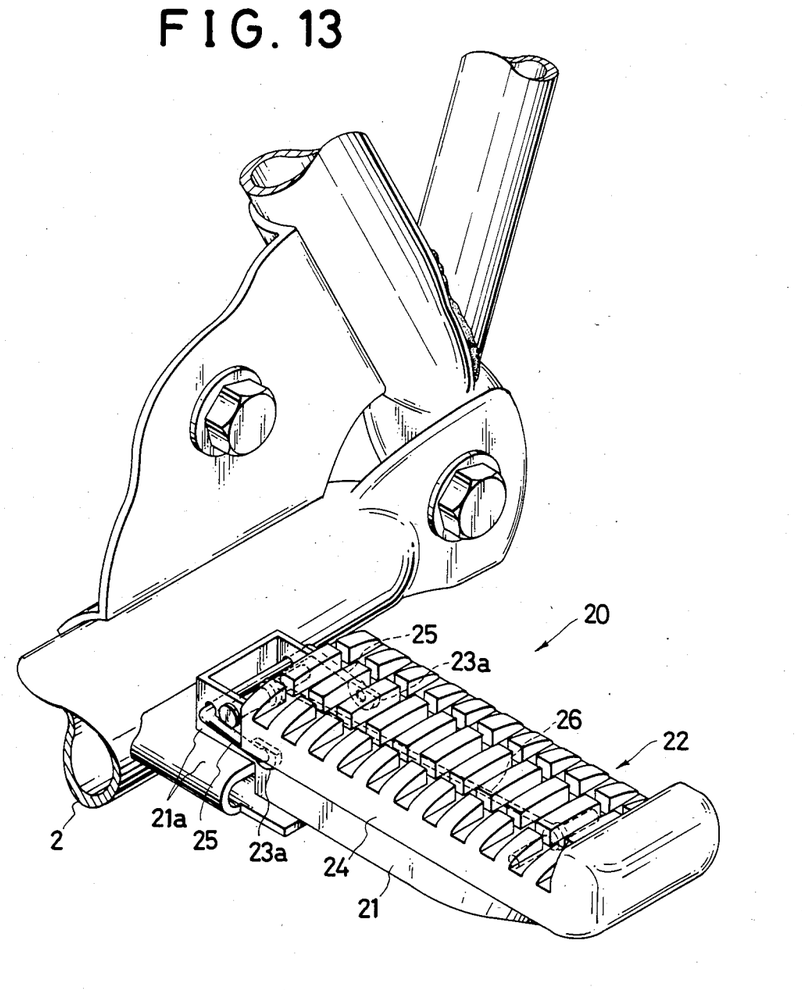
FIG. 13 is a perspective view showing a bar step according to still another embodiment with a cover in position for on-road use.
Figure 14:
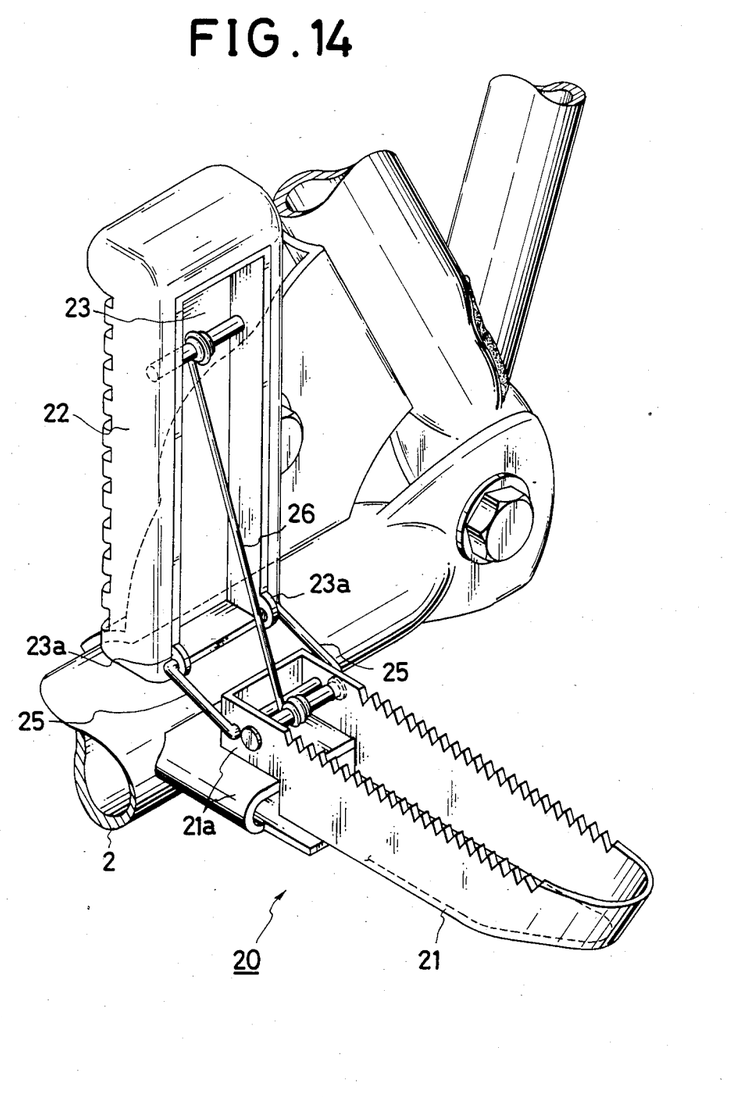
FIG. 14 is a perspective view showing the bar step of FIG. 13 with the cover in position for off-road use.
Figure 15:
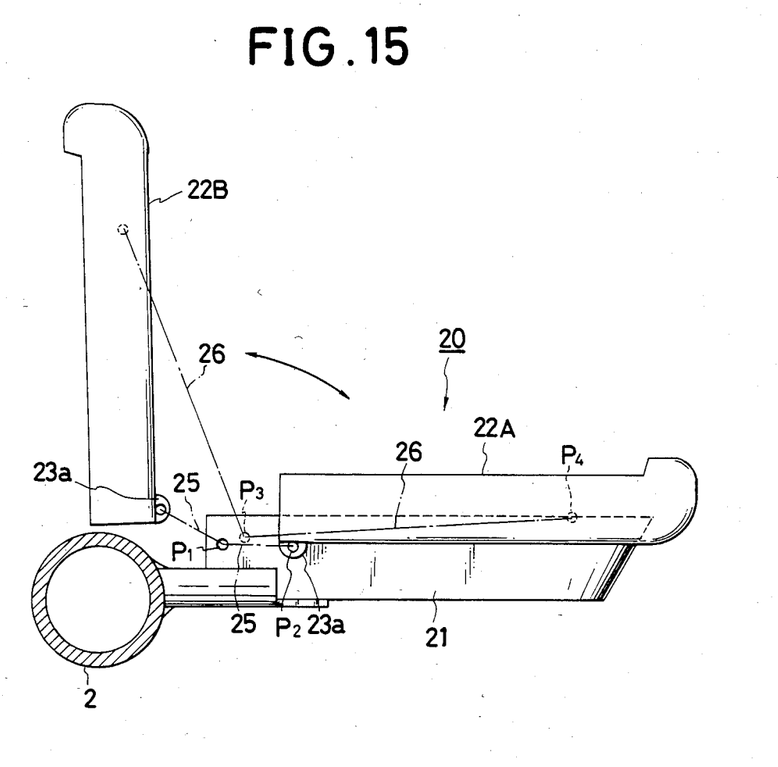
FIG. 15 is a schematic side elevational view diagrammatically illustrating the structure of the bar step of FIG. 13.

Another preferred embodiment of the bar step according to the present invention employing a link mechanism is illustrated in FIGS. 13 to 15. In this embodiment, a bar step 20 is formed of a metallic step main body 21 fixedly secured, at its base portion 21a, to the underframe 2 (having nearly the same configuration as the above-described step main body 4) and a cover member 22 swingably mounted to the step main body 21 by means of links 25, 25 and 26 (the links 25, 25 being arm portions of a U-shaped member). The cover member 22 is formed of a metal core 22 having a pair of tongues 23a in the proximity of one end portion thereof and a rubber piece 24 covering the upper and side surfaces of the metal core 23. The tongues 23a of the metal core 23 are coupled via a pair of links 25 to the upper base portion 21a of the step main body 21. The tip end portion of the metal core 23 is coupled via a link 26 to the opposite sidewalls of the step main body 21 at the upper base portion 21a. When the cover member 22 is swung from the attitude covering the top surface of the step main body 21 shown in FIG. 13 to the erected position, it is brought to an inclined attitude sufficient to retain the cover member 22 in position.

FIG. 15 diagramatically shows in a side elevational view as viewed from the front side of the vehicle body the attitudes of the cover member 22 shown in FIGS. 13 and 14, respectively, as well as the supporting mechanism for the cover member 22, in which reference symbols $P_1$, $P_2$, $P_3$ and $P_4$ designate coupling points between the respective links 25 and 26, step main body 21 and cover member 22. Also, reference numerals 22A and 22B designate the different attitudes of the cover member 22 shown in FIGS. 13 and 14, respectively. As will be apparent from FIG. 15, the cover member 22 is sufficiently shifted towards the vehicle body frame in its erected condition. When the rider places his foot on the step main body 21, the boot worn by the rider would hardly make contact with the cover member 22. Also, the cover member 22 can be maintained at a stable erected attitude because every one of the links 25 and link 26 takes an attitude tilted towards the vehicle body frame. It is to be noted that in the embodiment shown in FIGS. 13 to 15, the cover member 22 can be associated with the locking piece 5b or 5d as shown in FIGS. 9 to 12.

Figure 16:
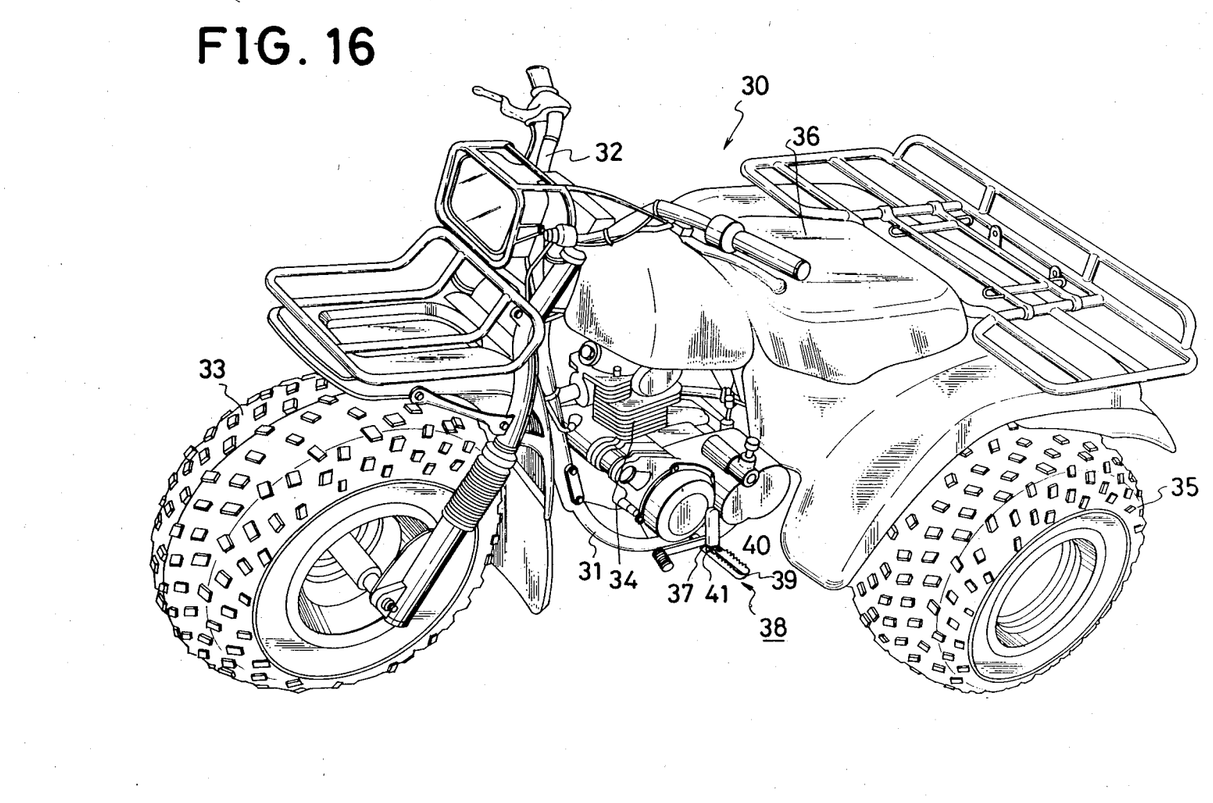
FIG. 16 is a perspective view of a motor tricycle provided with bar steps according to one preferred embodiment of the present invention.
Figure 17:
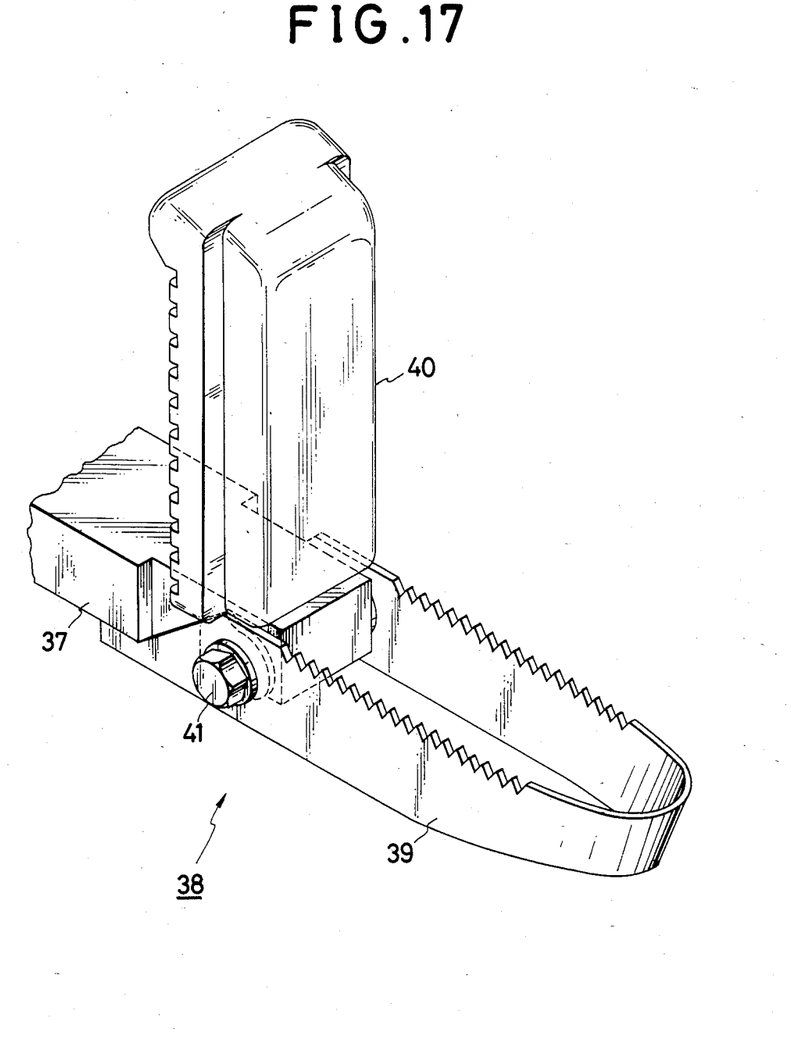
FIG. 17 is an enlarged perspective view of the bar step portion of FIG. 16.

In FIG. 16, a motor tricycle 30 is shown as being provided with bar steps according to one preferred embodiment of the present invention. This motor tricycle 30 includes, at its front portion, one front wheel 33 operably coupled to a steering handle 32. At its rear portion, a pair of right and left rear wheels 35 are operably coupled to an engine 34, and a seat 36 is located at its upper portion. Right and left vehicle body frames 31 are respectively provided with stays 37 projecting therefrom. Both a step main body 39 and a cover member 40 are swingably mounted to each of the stays. The step main body 39 and cover member 40 are mounted to the stay 37 by means of a bolt 41 as shown in FIG. 17 so that both members 39 and 40 can be erected integrally. The structure of a bar step 38 consisting of the above-described step main body 39 and cover member 40 is substantially identical to that of the bar step 3 shown in FIGS. 1 to 8 except for the structure of the mounting portion of the bar step. It is also possible that bar steps making use of a link mechanism similar to the bar steps 20 shown in FIGS. 13 to 15 may be mounted to the motor tricycle 30.

As will be obvious from the above description, since the bar step according to the present invention is formed of a step main body for off-road use and a cover member for on-road use and the cover member can be swung between the position for covering the step main body and the retracted position where the cover member is inclined toward the vehicle body frame, it is only necessary to cover the step main body with the cover member when running on public roads and to erect the cover member when running on rough terrain. The switching can be performed nearly in one action, and therefore, the rider is released from the inconvenience of replacing the bar steps for changed riding conditions as is the case with the bar steps in the prior art.

Of course the present invention should not be limited to the above-described embodiments but the invention should include every modified embodiment within the scope not departing from the spirit of the present invention.

What is claimed is:

1. Bar steps of a small-sized vehicle of the type that a rider rides the vehicle by straddling a vehicle body frame and a seat, which bar steps are provided in association with underframes of the vehicle body frame in order that the rider can place his right and left feet thereon, characterized in that each of said bar steps comprises a step main body provided in association with the underframe and having a teeth-shaped configuration on its top surface, and a cover member including an elastic piece as a part thereof which is swingably mounted in association with said step main body, and said cover member can be arbitrarily swung between a position for covering the step main body and a retracted position where the cover member is erected to incline toward the vehicle body frame.

2. Bar steps as claimed in claim 1, characterized in that said step main body includes a pair of opposed sidewalls having teeth-shaped notches formed along their top edge.

3. Bar steps as claimed in claim 1, characterized in that said elastic piece is made of rubber.

4. Bar steps as claimed in claim 1, characterized in that said cover member is formed of a channel-shaped metal core having a pair of tongues at its base end portion and an elastic piece covering the outer surface of the channel bottom wall, and fitting in the underside groove of the channel-shaped metal core.

5. Bar steps as claimed in claim 4, characterized in that said elastic piece made of rubber is integrally secured to said core metal by baking.

6. Bar steps as claimed in claim 1, characterized in that said step main body includes a pair of opposed sidewalls having teeth-shaped notches formed along their top edges, said cover member is formed of a channel-shaped metal core having a pair of tongues at its base end portion and an elastic piece covering the outer surface of the channel bottom wall and fitting in the underside groove of the channel-shaped metal core, said elastic piece covers the bottom edges of said metal core from the underside and projects downwards with respect to the bottom of the metal core, and the projecting portion of said elastic piece can be detachably fitted in the space between the opposed sidewalls of said step main body.

7. Bar steps as claimed in claim 6, characterized in that the portions of said elastic piece covering the side surfaces of said metal core project sidewards with respect to said projecting portions of the elastic piece.

8. Bar steps as claimed in claim 6, characterized in that said tongues of the metal core are positioned between the opposed side walls of said step main body and are supported from said both opposed sidewalls in selectively swingable manner about a single pivotal axis.

9. Bar steps as claimed in claim 1, characterized in that said step main body and said cover member are supported from a stay rigidly coupled to said underframe in a selectively swingable manner about a single pivotal axis so that either the cover member can be swung separately or the cover member and the step main body can be swung integrally.

10. Bar steps as claimed in claim 1, characterized in that said cover member is formed of a channel-shaped metal core having a pair of tongues at its base end portion and an elastic piece covering the outer surface of the channel bottom wall, said cover member is made swingable between a position for covering said step main body and a position for covering said step main body and a position retracted toward the vehicle body frame by such coupling between said cover member and said step main body that a pair of tongues of said cover member is coupled to said step main body via a first swingable link and a member secured to the inside of said channel-shaped core metal is coupled to said step main body via a second swingable link, and said channel-shaped core metal is formed in such dimension that it can cover said step main body as striding the step main body.

11. Bar steps as claimed in claim 1 characterized in that a hook is mounted directly or indirectly to said vehicle body frame, locking means made of elastic material is mounted to a free end portion of said cover member, and said locking means can be detachably engaged with said hook when said cover member takes an erected attitude.

12. Bar steps as claimed in claim 1 characterized in that locking means made of elastic material is mounted relative to said vehicle body frame, a small protrusion is provided at a free end portion of said cover member, and said locking means can be detachably engaged with said small protrusion when said cover member takes an erected attitude.

* * * * *